United States Patent
Brickell

(10) Patent No.: US 7,366,305 B2
(45) Date of Patent: Apr. 29, 2008

(54) PLATFORM AND METHOD FOR ESTABLISHING TRUST WITHOUT REVEALING IDENTITY

(75) Inventor: Ernie F. Brickell, Portland, OR (US)

(73) Assignee: Intel Corporation, Santa Clara, CA (US)

(*) Notice: Subject to any disclaimer, the term of this patent is extended or adjusted under 35 U.S.C. 154(b) by 686 days.

(21) Appl. No.: 10/675,165

(22) Filed: Sep. 30, 2003

(65) Prior Publication Data

US 2005/0069135 A1  Mar. 31, 2005

(51) Int. Cl.
*H04L 9/00* (2006.01)

(52) U.S. Cl. .......................... 380/277; 380/28; 380/30; 708/518

(58) Field of Classification Search ................... 726/26, 726/16, 30; 713/156, 168, 170–171; 380/30, 380/277, 28; 708/606, 491, 518

See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. | 711/166 |
| 4,276,594 A | 6/1981 | Morley | |
| 4,278,837 A | 7/1981 | Best | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,347,565 A | 8/1982 | Kaneda et al. | |
| 4,366,537 A | 12/1982 | Heller et al. | |
| 4,403,283 A | 9/1983 | Myntti et al. | |
| 4,419,724 A | 12/1983 | Branigin et al. | |
| 4,430,709 A | 2/1984 | Schleupen et al. | |
| 4,521,852 A | 6/1985 | Guttag | |
| 4,571,672 A | 2/1986 | Hatada et al. | |
| 4,759,064 A | 7/1988 | Chaum | |

(Continued)

FOREIGN PATENT DOCUMENTS

EP  0892521  1/1999

(Continued)

OTHER PUBLICATIONS

Berg, Cliff , "How Do I Create a Signed Applet?", *Dr. Dobb's Journal*, (Aug. 1997), 1-9.

(Continued)

*Primary Examiner*—T. B. Truong
(74) *Attorney, Agent, or Firm*—Blakely, Sokoloff, Taylor & Zafman LLP

(57) ABSTRACT

One aspect of an embodiment of the invention provides a method and platform to prove to a challenger that a responder device possesses cryptographic information from a certifying manufacturer. This is accomplished by performing a direct proof by the responder device to prove that the responder device possesses the cryptographic information. The direct proof comprises at least one exponentiation being conducted using an exponent having a bit length no more than one-half a bit length of a modulus (n).

10 Claims, 10 Drawing Sheets

U.S. PATENT DOCUMENTS

| | | | |
|---|---|---|---|
| 4,795,893 A | 1/1989 | Ugon | |
| 4,802,084 A | 1/1989 | Ikegaya et al. | |
| 4,825,052 A | 4/1989 | Chemin et al. | |
| 4,843,541 A | 6/1989 | Bean et al. | |
| 4,907,270 A | 3/1990 | Hazard | |
| 4,907,272 A | 3/1990 | Hazard | |
| 4,910,774 A | 3/1990 | Barakat | |
| 4,974,159 A | 11/1990 | Hargrove et al. | |
| 4,975,836 A | 12/1990 | Hirosawa et al. | |
| 5,007,082 A | 4/1991 | Cummins | |
| 5,022,077 A | 6/1991 | Bealkowski et al. | |
| 5,075,842 A | 12/1991 | Lai | |
| 5,079,737 A | 1/1992 | Hackbarth | 711/164 |
| 5,187,802 A | 2/1993 | Inoue et al. | |
| 5,230,069 A | 7/1993 | Brelsford et al. | |
| 5,237,616 A | 8/1993 | Abraham et al. | |
| 5,255,379 A | 10/1993 | Melo | |
| 5,287,363 A | 2/1994 | Wolf et al. | |
| 5,293,424 A | 3/1994 | Hotley et al. | |
| 5,295,251 A | 3/1994 | Wakui et al. | |
| 5,317,705 A | 5/1994 | Gannon et al. | |
| 5,319,760 A | 6/1994 | Mason et al. | |
| 5,361,375 A | 11/1994 | Ogi | |
| 5,386,552 A | 1/1995 | Garney | |
| 5,421,006 A | 5/1995 | Jablon et al. | |
| 5,434,999 A | 7/1995 | Goire et al. | |
| 5,437,033 A | 7/1995 | Inoue et al. | |
| 5,442,645 A | 8/1995 | Ugon et al. | |
| 5,455,909 A | 10/1995 | Blomgren et al. | |
| 5,459,867 A | 10/1995 | Adams et al. | |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,488,716 A | 1/1996 | Schneider et al. | |
| 5,504,922 A | 4/1996 | Seki et al. | |
| 5,506,975 A | 4/1996 | Onodera | |
| 5,511,217 A | 4/1996 | Nakajima et al. | |
| 5,522,075 A | 5/1996 | Robinson et al. | |
| 5,528,231 A | 6/1996 | Patarin | |
| 5,533,126 A | 7/1996 | Hazard et al. | |
| 5,555,385 A | 9/1996 | Osisek | |
| 5,555,414 A | 9/1996 | Hough et al. | |
| 5,560,013 A | 9/1996 | Scalzi et al. | |
| 5,564,040 A | 10/1996 | Kubala | |
| 5,566,323 A | 10/1996 | Ugon | |
| 5,568,552 A | 10/1996 | Davis | |
| 5,574,936 A | 11/1996 | Ryba et al. | |
| 5,582,717 A | 12/1996 | Di Santo | |
| 5,604,805 A | 2/1997 | Brands | |
| 5,606,617 A | 2/1997 | Brands | |
| 5,615,263 A | 3/1997 | Takahashi | |
| 5,628,022 A | 5/1997 | Ueno et al. | |
| 5,633,929 A | 5/1997 | Kaliski, Jr. | |
| 5,657,445 A | 8/1997 | Pearce | |
| 5,668,971 A | 9/1997 | Neufeld | |
| 5,680,547 A | 10/1997 | Chang | |
| 5,684,948 A | 11/1997 | Johnson et al. | |
| 5,706,469 A | 1/1998 | Kobayashi | |
| 5,717,903 A | 2/1998 | Bonola | |
| 5,720,609 A | 2/1998 | Pfefferle | |
| 5,721,222 A | 2/1998 | Bernstein et al. | |
| 5,729,760 A | 3/1998 | Poisner | |
| 5,737,604 A | 4/1998 | Miller et al. | |
| 5,737,760 A | 4/1998 | Grimmer, Jr. et al. | 711/163 |
| 5,740,178 A | 4/1998 | Jacks et al. | |
| 5,752,046 A | 5/1998 | Oprescu et al. | |
| 5,757,919 A | 5/1998 | Herbert et al. | |
| 5,764,969 A | 6/1998 | Kahle | |
| 5,796,835 A | 8/1998 | Saada | |
| 5,796,845 A | 8/1998 | Serikawa et al. | |
| 5,805,712 A | 9/1998 | Davis | |
| 5,809,546 A | 9/1998 | Greenstein et al. | |
| 5,815,665 A | 9/1998 | Teper et al. | |
| 5,825,875 A | 10/1998 | Ugon | |
| 5,825,880 A | 10/1998 | Sudia et al. | |
| 5,835,594 A | 11/1998 | Albrecht et al. | |
| 5,844,986 A | 12/1998 | Davis | |
| 5,852,717 A | 12/1998 | Bhide et al. | |
| 5,854,913 A | 12/1998 | Goetz et al. | |
| 5,867,577 A | 2/1999 | Patarin | |
| 5,872,994 A | 2/1999 | Akiyama et al. | |
| 5,890,189 A | 3/1999 | Nozue et al. | |
| 5,900,606 A | 5/1999 | Rigal | |
| 5,901,225 A | 5/1999 | Ireton et al. | |
| 5,903,752 A | 5/1999 | Dingwall et al. | |
| 5,919,257 A | 7/1999 | Trostle | |
| 5,935,242 A | 8/1999 | Madany et al. | |
| 5,935,247 A | 8/1999 | Pai et al. | |
| 5,937,063 A | 8/1999 | Davis | |
| 5,953,422 A | 9/1999 | Angelo et al. | |
| 5,953,502 A | 9/1999 | Helbig, Sr. | |
| 5,956,408 A | 9/1999 | Arnold | |
| 5,970,147 A | 10/1999 | Davis et al. | |
| 5,978,475 A | 11/1999 | Schneier et al. | |
| 5,978,481 A | 11/1999 | Ganesan et al. | |
| 5,987,131 A * | 11/1999 | Clapp | 713/171 |
| 5,987,557 A | 11/1999 | Ebrahim | |
| 5,999,627 A * | 12/1999 | Lee et al. | 380/30 |
| 6,014,745 A | 1/2000 | Ashe | |
| 6,035,374 A | 3/2000 | Panwar et al. | |
| 6,044,478 A | 3/2000 | Green | |
| 6,055,637 A | 4/2000 | Hudson et al. | |
| 6,058,478 A | 5/2000 | Davis | |
| 6,061,794 A | 5/2000 | Angelo | |
| 6,075,938 A | 6/2000 | Bugnion et al. | |
| 6,085,296 A | 7/2000 | Karkhanis et al. | |
| 6,088,262 A | 7/2000 | Nasu | |
| 6,092,095 A | 7/2000 | Maytal | |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,131,166 A | 10/2000 | Wong-Isley | |
| 6,138,239 A | 10/2000 | Veil | |
| 6,148,379 A | 11/2000 | Schimmel | |
| 6,158,546 A | 12/2000 | Hanson et al. | |
| 6,173,417 B1 | 1/2001 | Merrill | |
| 6,175,924 B1 | 1/2001 | Arnold | |
| 6,175,925 B1 | 1/2001 | Nardone et al. | |
| 6,178,509 B1 | 1/2001 | Nardone | |
| 6,182,089 B1 | 1/2001 | Ganapathy et al. | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,212,635 B1 | 4/2001 | Reardon | |
| 6,222,923 B1 | 4/2001 | Schwenk | |
| 6,249,872 B1 | 6/2001 | Wildgrube et al. | 713/200 |
| 6,252,650 B1 | 6/2001 | Nakaumra | |
| 6,269,392 B1 | 7/2001 | Cotichini et al. | |
| 6,272,533 B1 | 8/2001 | Browne et al. | 709/213 |
| 6,272,637 B1 | 8/2001 | Little et al. | 713/194 |
| 6,275,933 B1 | 8/2001 | Fine et al. | |
| 6,282,650 B1 | 8/2001 | Davis | |
| 6,282,651 B1 | 8/2001 | Ashe | |
| 6,282,657 B1 | 8/2001 | Kaplan et al. | |
| 6,292,874 B1 | 9/2001 | Barnett | 711/153 |
| 6,301,646 B1 | 10/2001 | Hostetter | |
| 6,308,270 B1 | 10/2001 | Guthery et al. | |
| 6,314,409 B2 | 11/2001 | Schneck et al. | |
| 6,321,314 B1 | 11/2001 | Van Dyke | |
| 6,327,652 B1 | 12/2001 | England et al. | |

| | | |
|---|---|---|
| 6,330,670 B1 | 12/2001 | England et al. |
| 6,339,815 B1 | 1/2002 | Feng |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. ............ 710/105 |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,473,508 B1 | 10/2002 | Young et al. |
| 6,473,800 B1 | 10/2002 | Jerger et al. |
| 6,496,847 B1 | 12/2002 | Bugnion et al. |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 6,795,966 B1 | 9/2004 | Lim et al. |
| 6,804,630 B2 | 10/2004 | Lee et al. |
| 6,959,086 B2 * | 10/2005 | Ober et al. ................... 380/30 |
| 6,988,250 B1 | 1/2006 | Proudler et al. |
| 7,103,529 B2 | 9/2006 | Zimmer |
| 7,133,990 B2 | 11/2006 | Link et al. |
| 7,165,181 B2 | 1/2007 | Brickell |
| 7,272,831 B2 | 9/2007 | Cota-Robles et al. |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0004900 A1 | 1/2002 | Patel |
| 2002/0007456 A1 | 1/2002 | Peinado et al. |
| 2002/0023032 A1 | 2/2002 | Pearson et al. |
| 2002/0147916 A1 | 10/2002 | Strongin et al. |
| 2002/0166061 A1 | 11/2002 | Falik et al. |
| 2002/0169717 A1 | 11/2002 | Challener |
| 2003/0002668 A1 | 1/2003 | Graunke et al. |
| 2003/0018892 A1 | 1/2003 | Tello |
| 2003/0028807 A1* | 2/2003 | Lawman et al. ............ 713/201 |
| 2003/0037089 A1 | 2/2003 | Cota-Robles et al. |
| 2003/0074548 A1 | 4/2003 | Cromer et al. |
| 2003/0093687 A1 | 5/2003 | Westhoff et al. |
| 2003/0112008 A1 | 6/2003 | Hennig |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188156 A1 | 10/2003 | Yasala et al. |
| 2003/0188179 A1 | 10/2003 | Challener et al. |
| 2003/0196085 A1 | 10/2003 | Lampson et al. |
| 2003/0226031 A1* | 12/2003 | Proudler et al. ............ 713/200 |
| 2003/0231328 A1 | 12/2003 | Chapin et al. |
| 2003/0235175 A1 | 12/2003 | Naghian et al. |
| 2004/0003288 A1* | 1/2004 | Wiseman et al. ........... 713/201 |
| 2004/0117539 A1 | 6/2004 | Bennett et al. |
| 2004/0128345 A1 | 7/2004 | Robinson et al. |
| 2004/0128670 A1 | 7/2004 | Robinson et al. |

FOREIGN PATENT DOCUMENTS

| | | |
|---|---|---|
| EP | 1055989 | 11/2000 |
| EP | 1056014 | 11/2000 |
| FR | 2 620 248 | 3/1989 |
| FR | 2 700 430 | 7/1994 |
| FR | 2 714 780 | 7/1995 |
| FR | 2 742 618 | 6/1997 |
| FR | 2 752 122 | 2/1998 |
| FR | 2 763 452 | 11/1998 |
| FR | 2 830 147 | 3/2003 |
| WO | WO9812620 | 3/1998 |
| WO | WO9918511 | 4/1999 |
| WO | WO0201794 | 1/2002 |
| WO | WO02060121 | 8/2002 |
| WO | WO03058412 | 7/2003 |

OTHER PUBLICATIONS

Brands, Stefan , "Restictive Blinding of Secret-Key Certificates", *Springer-Verlag XP002201306*, (1995),Chapter 3.

Chien, Andrew A., et al., "Safe and Protected Execution for the Morph/AMRM Reconfigurable Processor", *7th Annual IEEE Symposium, FCCM '99 Proceedings*, XP010359180, ISBN 0-7695-0375-6, Los Alamitos, CA, (Apr. 21, 1999),209-221.

Compaq Computer Corporation, et al., "Trusted Computing Platform Alliance (TCPA) Main Specification Version 1.1a", (Dec. 2001), 1-321.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Goldberg, Robert P., "Survey of Virtual Machine Research", *Computer Magazine*, (Jun. 1974),34-35.

Gong, Li , et al., "Going Behond the Sandbox: An Overview of the New Security Architecture in the Java Development Kit 1.2", *Proceedings of the USENIX Symposium on Internet Technologies and Systems*, Monterey, CA,(Dec. 1997).

Gum, P. H., "System/370 Extended Architecture: Facilities for Virtual Machines", *IBM J. Research Development*, vol. 27, No. 6, (Nov. 1983),530-544.

Heinrich, Joe , "MIPS R4000 Microprocessor User's Manual, Second Edition", *Chapter 4 "Memory Management"*, (Jun. 11, 1993),61-97.

IBM, "Information Display Technique for a Terminate Stay Resident Program IBM Technical Disclosure Bulletin", *TDB-ACC-No. NA9112156*, vol. 34, Issue 7A, (Dec. 1, 1991), 156-158.

Intel, "IA-32 Intel Architecture Software Developer's Manual", vol. 3: *System Programming Guide*, Inter Corporation—2003, 13-1 through 13-24.

Intel, "Intel386 DX Microprocessor 32-Bit CHMOS Microprocessor With Integrated Memory Management", (1995),5-56.

Karger, Paul A., et al., "A VMM Security Kernal for the VAX Architecture", *Proceedings of the Symposium on Research in Security and Privacy*, XP010020182, ISBN 0-8186-2060-9, Boxborough, MA, (May 7, 1990),2-19.

Kashiwagi, Kazuhiko , et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Lawton, Kevin , et al., "Running Multiple Operating Systems Concurrently on an IA32 PC Using Virtualization Techniques", http://www.plex86.org/research/paper.txt, (Nov. 29, 1999), 1-31.

Luke, Jahn , et al., "Replacement Strategy for Aging Avionics Computers", *IEEE AES Systems Magazine*, XP002190614,(Mar. 1999).

Menezes, Oorschot , "Handbook of Applied Cryptography", *CRC Press LLC*, USA XP002201307, (1997),475.

Motorola, "M68040 User's Manual", (1993), 1-1 to 8-32.

Richt, Stefan, et al., "In-Circuit-Emulator Wird Echtzeittauglich", *Elektronic, Franzis Verlag GMBH*, Munchen, DE, vol. 40, No. 16, XP000259620,(100-103),Aug. 6, 1991.

Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000), 1-17.

Rosenblum, M., "Virtual Platform: A Virtual Machine Monitor for Commodity PC", *Proceedings of the 11th Hotchips Conference*, (Aug. 17, 1999),185-196.

Saez, Sergio, et al., "A Hardware Scheduler for Complex Real-Time Systems", *Proceedings of the IEEE International Symposium on Industrial Electronics*, XP002190615,(Jul. 1999),43-48.

Sherwood, Timothy, et al., "Patchable Instruction ROM Architecture", *Department of Computer Science and Engineering*University of California, San Diego, La Jolla, CA, (Nov. 2001).

Coulouris, George, et al., "Distributed Systems, Concepts and Designs", *2nd Edition*, (1994),422-424.

Crawford, John, "Architecture of the Intel 80386", *Proceedings of the IEEE International Conference on Computer Design: VLSI in Computers and Processors (ICCD '86)*, (Oct. 6, 1986), 155-160.

Fabry, R.S., "Capability-Based Addressing", Fabry, R.S., "*Capability-Based Addressing,*" Communications of the ACM, vol. 17, No. 7, (Jul. 1974),403-412.

Frieder, Gideon, "The Architecture And Operational Characteristics of the VMX Host Machine", *The Architecture And Operatinal Characteristics of the VMX Host Machine, IEEE*, (1982),9-16.

HP Mobile Security Overview, "HP Mobile Security Overview", (Sep. 2002),1-10.

IBM Corporation, "IBM ThinkPad T30 Notebooks", *IBM Product Specification*, located at www-1.ibm.com/services/files/cisco_130_spec_sheet_070202.pdf, last visited Jun. 23, 2004,(Jul. 2, 2002), 1-6.

Intel Corporation, "IA-64 System Abstraction Layer Specification", *Intel Product Specification*, Order No. 245359-001, (Jan. 2000), 1-112.

Intel Corporation, "Intel 82802AB/82802AC Firmware Hub (FWH)", *Intel Product Datasheet*, Document No. 290658-004, (Nov. 2000), 1-6, 17-28.

Intel Corporation, "Intel IA-64 Architecture Software Developer's Manual", *vol. 2: IA-64 System Architecture*, Order No. 245318-001, (Jan. 2000),i, ii, 5.1-5.3, 11.1-11.8, 11.23-11.26.

Menezes, Alfred J., et al., "Handbook of Applied Cryptography", *CRC Press Series on Discrete Mathematices and its Applications*, Boca Raton, FL, XP002165287, ISBN 0849385237,(Oct. 1996),403-405, 506-515, 570.

Nanba, S., et al., "VM/4: ACOS-4 Virtual Machine Architecture", *VM/4: ACOS-4 Virtual Machine Architecture, IEEE*, (1985),171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.rsasecurity.com/node.asp?id=1313, 1-2.

Schneier, Bruce, "Applied Cryptography: Protocols, Algorithm, and Source Code in C", Wiley, John & Sons, Inc., XP002939871; ISBN 0471117099,(Oct. 1995),47-52.

Schneier, Bruce, "Applied Cryptography: Protocols, Algorithm, and Source Code in C", Wiley, John & Sons, Inc., XP002138607; ISBN 0471117099,(Oct. 1995),56-65.

Schneier, Bruce, "Applied Cryptography: Protocols, Algorithms, and Source Code in C", Wiley, John & Sons, Inc., XP0021111449; ISBN 0471117099,(Oct. 1995),169-187.

Schneier, Bruce, "Applied Cryptography: Protocols, Algorithms, and Source Code in C", *2nd Edition*; Wiley, John & Sons, Inc., XP002251738; ISBN 0471128457,(Nov. 1995),28-33; 176-177; 216-217; 461-473; 518-522.

Hall, Judith S., et al., "Virtualizing the VAX Architecture", ACM SIGARCH Computer Architecture News, Proceedings of the 18th Annual International Symposium on Computer Architecture, vol. 19, Issue No. 3, Apr. 1991, 10 pages.

Rosenberg, Jonathan B., "How Debuggers Work Algorithms, Data Structures, and Architecture", Chapters 3 and 5 Hardware Debugger Facilities, Wiley Computer Publishing, United States, 1996, pp. 42-43, 95, 96 and 99.

Wenisch, et al., "Store-Ordered Streaming of Shared Memory", Proceedings of the 14th Int'l Conference on Parallel Architectures and Compilation Techniques (PACT'05) Sep. 2005, IEEE, pp. 75-84.

Micciancio, Daniele, et al., "Efficient and COncurrent Zero-Knowledge from any public coin HVZK protocol", XP-002313884, [Online], Retrieved from the Internet: URL:http://eprint.iarc.org/2002/090.pdf> [retrieved on Sep. 2, 2004], (Jul. 8, 2002), 20 pgs.

Prabhakaran, Manoj, et al., "Concurrent Zero Knowledge Proffs with Logarithimic Round-Complexity", XP002313883, [Online], Retrieved from the Internet: URL:http://eprint.iarc.org/2002/055.pdf> [retrieved on Sep. 22, 2004], (May 6, 2002), 20 pgs.

Tung, Brian, "The Moron's Guide to Kerberos, Version1.2.2", [Online] Retrieved on the Internet at: http://www/web.archive.org/web/20000815233731/http://www.is.edu/~brian/security/kerberos.html., Retrieved on Oct. 4, 2006, (Dec. 2006), 11 pgs.

Zemor, Gilles, "Cours de Crytopgraphy", XP002313885, Cassinni, Paris, ISBN 2-844225-020-6, (Nov. 2000), 165-173.

RSA Security, "Hardware Authenticators", www.rsasecurity.com/node.asp?id=1158, 1-2, 2007.

RSA Security, "RSA SecurID Authenticators", www.rsasecurity.com/products.securid/datasheets/SID_DS_0103.pdf, 1-2, 2007.

RSA Security, "Software Authenticators", www.rsasecurity.com/node.asp?id=1313, 1-2, 2007.

\* cited by examiner

PLATFORM AND METHOD FOR ESTABLISHING TRUST WITHOUT REVEALING IDENTITY

FIELD

Embodiments of the invention generally relate to secured communications, namely a platform and method for establishing that information came from a trusted hardware device without revealing information concerning the identity of the trusted hardware device.

GENERAL BACKGROUND

For many modern communication systems, the reliability and security of exchanged information is a significant concern. To address this concern, the Trusted Computing Platform Alliance(TCPA) developed security solutions for platforms. In accordance with a TCPA specification entitled "Main Specification Version 1.1b," published on or around Feb. 22, 2002, each personal computer (PC) is implemented with a trusted hardware device referred to as a Trusted Platform Module (TPM). Each TPM contains a unique endorsement key pair (EK), which features a public EK key (PUBEK) and a private EK key (PRIVEK). The TPM typically has a certificate for the PUBEK signed by the manufacturer.

During operation, the TPM records information about the software and hardware environment of its PC. In order for an outside party (referred to as a "challenger") to learn about the software and/or hardware environment of the PC, a challenger can request the TPM to generate and provide a report. This creates two opposing security concerns.

First, the challenger needs to be sure that the report is really coming from a valid TPM. Second, the owner of the PC wants to maintain as much privacy as possible. In particular, the owner of the PC wants to be able to give reports to different challengers without those challengers being able to determine that the reports are coming from the same TPM.

One proposed solution to these security issues is to establish a Trusted Third Party (TTP). For instance, the TPM would create an Attestation Identify Key pair (AIK), namely a public AIK key and a private AIK key. The public AIK key would be placed in a certificate request signed with the PRIVEK, and subsequently sent to the TTP. The certificate for the PUBEK would also be sent to the TTP. The TTP would check that the signed certificate request is valid, and if valid, the TTP would issue a certificate to the TPM. The TPM would then use the public AIK and the TTP issued certificate when the TPM received a request from a challenger. Since the AIK and certificate would be unrelated to the EK, the challenger would get no information about the identity of the TPM or PC implemented with the TPM.

In practice, the above-identified approach is problematic because it requires TTPs to be established. Identifying and establishing various parties that can serve as TTPs has proven to be a substantial obstacle.

Another proposed solution is set forth in a co-pending U.S. application Ser. No. 10/306,336, which is also owned by the assignee of the present application. This technique utilizes two interactive proofs (IP1, IP2). Thus, in order to achieve a probability of cheating to be less than 1 in $2^{20}$, the TPM would need to complete twenty (20) modular exponentiations with a 2048 bit modulus and a 2000-bit exponent for IP1, and twenty (20) modular exponentiations with a 2048-bit modulus and a 160-bit exponent for IP2. Since a TPM may require forty-five (45) seconds to compute a single modular exponentiation with a 2048-bit modulus and a 2000-bit exponent, the efficiency of the TPM computations has proven to be a substantial obstacle as well.

BRIEF DESCRIPTION OF THE DRAWINGS

Features and advantages of embodiments of the invention will become apparent from the following detailed description of the invention in which.

DETAILED DESCRIPTION

Figure 1:
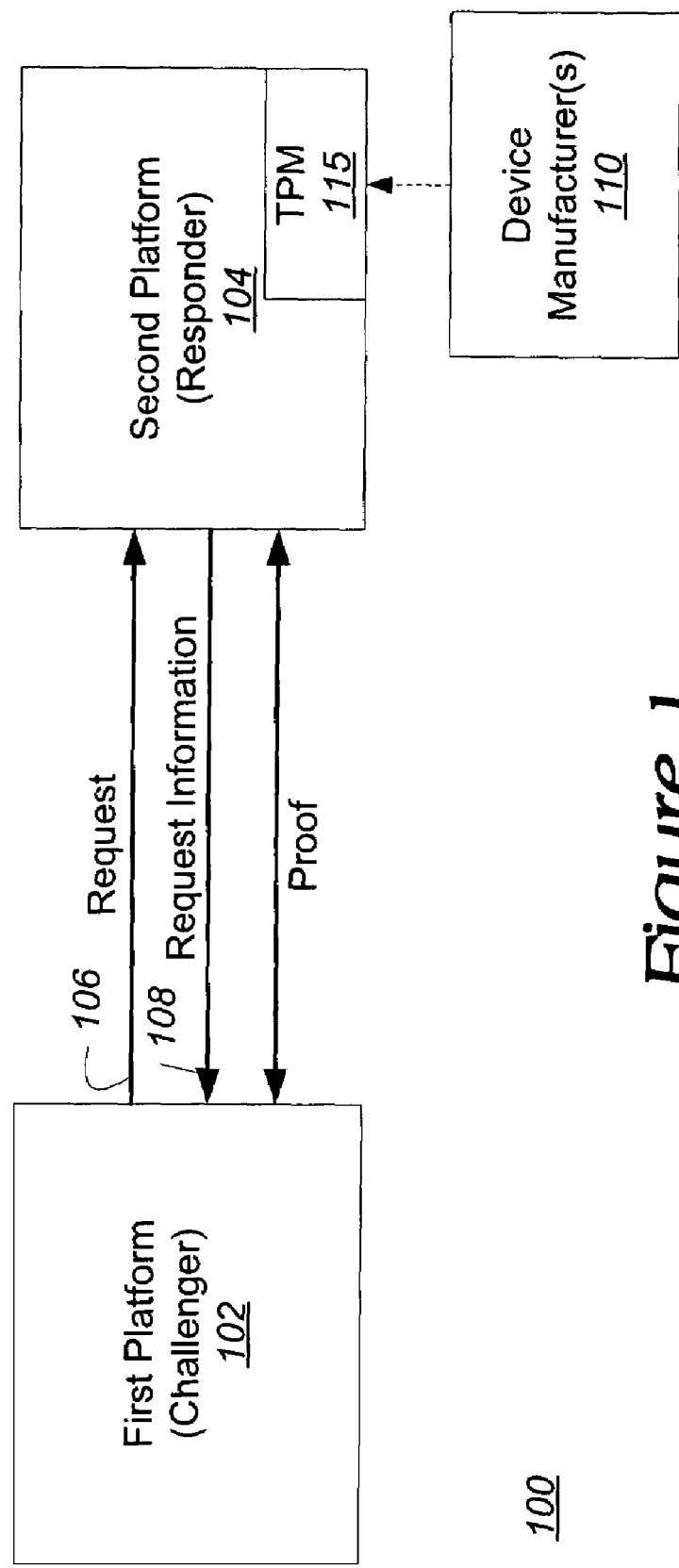
FIG. 1 illustrates a system featuring a platform implemented with a Trusted Platform Module (TPM) that operates in accordance with one embodiment of the invention.

Embodiments of the invention set forth in the following detailed description generally relate to secured communications. Herein, at least one embodiment of the invention relates to a system, device and method for proving that received information came from a trusted hardware device without revealing information concerning the identity of the trusted hardware device or stored cryptographic information. This is accomplished without the use of a Trusted Third Party (TTP). Rather, it is accomplished by a "direct proof" methodology in which computations by the TPM involve exponentiations using exponents of fixed length and small bit length (e.g., 160 bits). The bit length of each exponent is substantially less than one-half the bit length of a modulus associated with the exponentiation (e.g., one-third or less, normally one-eighth or less).

For one embodiment of the invention, the functionality of the TPM, which is configured to prove to a challenger that information (e.g., cryptographic key, digital signature, digital certificate, etc.) came from the TPM, is deployed as firmware. However, it is contemplated that such functionality may be deployed as dedicated hardware or software. Instructions or code forming the firmware or software are stored on a machine-readable medium.

Herein, "machine-readable medium" may include, but is not limited to a floppy diskette, hard disk, optical disk (e.g., CD-ROMs, DVDs, mini-DVDs, etc.), magneto-optical disk, semiconductor memory such as read-only memory (ROM), random access memory (RAM), any type of programmable read-only memory (e.g., programmable read-only memory "PROM", erasable programmable read-only memories "EPROM", electrically erasable programmable read-only memories "EEPROM", or flash), magnetic or optical cards, or the like. It is contemplated that a signal itself and/or a communication link can be regarded as machine-readable medium since software may be temporarily stored as part of a downloaded signal or during propagation over the communication link.

In the following description, certain terminology is used to describe certain features of one or more embodiments of the invention. For instance, "platform" is defined as any type of communication device that is adapted to transmit and receive information. Examples of various platforms include, but are not limited or restricted to computers, personal digital assistants, cellular telephones, set-top boxes, facsimile machines, printers, modems, routers, or the like. A "communication link" is broadly defined as one or more information-carrying mediums adapted to a platform. Examples of various types of communication links include, but are not limited or restricted to electrical wire(s), optical fiber(s), cable(s), bus trace(s), or wireless signaling technology.

A "challenger" refers to any entity (e.g., person, platform, system, software, and/or device) that requests some verification of authenticity or authority from another entity. Normally, this is performed prior to disclosing or providing the requested information. A "responder" refers to any entity that has been requested to provide some proof of its authority, validity, and/or identity. A "device manufacturer," which may be used interchangeably with "certifying manufacturer," refers to any entity that manufactures or configures a platform or device (e.g., a Trusted Platform Module).

As used herein, to "prove" or "convince" a challenger that a responder has possession or knowledge of some cryptographic information (e.g., digital signature, a secret such as a key, etc.) means that, based on the information and proof disclosed to the challenger, there is a high probability that the responder has the cryptographic information. To prove this to a challenger without "revealing" or "disclosing" the cryptographic information to the challenger means that, based on the information disclosed to the challenger, it would be computationally infeasible for the challenger to determine the cryptographic information.

Such proofs are hereinafter referred to as direct proofs. The term "direct proof" refers to zero-knowledge proofs, as these types of proofs are commonly known in the field.

Throughout the description and illustration of the various embodiments of the invention discussed hereinafter, coefficients, variables, and other symbols (e.g., "h") are referred to by the same label or name. Therefore, where a symbol appears in different parts of an equation as well as different equations or functional description, the same symbol is being referenced.

I. General Architecture

Referring now to FIG. 1, an exemplary embodiment of a system featuring a platform implemented with a trusted hardware device (referred to as "Trusted Platform Module" or "TPM") that operates in accordance with one embodiment of the invention is shown. A first platform 102 (Challenger) transmits a request 106 that a second platform 104 (Responder) provides information about itself. In response to request 106, second platform 104 provides the requested information 108.

Additionally, for heightened security, first platform 102 may need to verify that requested information 108 came from a device manufactured by either a selected device manufacturer or a selected group of device manufacturers (hereinafter referred to as "device manufacturer(s) 110"). For instance, for one embodiment of the invention, first platform 102 challenges second platform 104 to show that it has cryptographic information (e.g., a signature) generated by device manufacturer(s) 110. The challenge may be either incorporated into request 106 (as shown) or a separate transmission. Second platform 104 replies to the challenge by providing information, in the form of a reply, to convince first platform 102 that second platform 104 has cryptographic information generated by device manufacturer(s) 110, without revealing the cryptographic information. The reply may be either part of the requested information 108 (as shown) or a separate transmission.

In one embodiment of the invention, second platform 104 comprises a Trusted Platform Module (TPM) 115. TPM 115 is a cryptographic device that is manufactured by device manufacturer(s) 110 and conforms to the operations of the protocols described in FIGS. 7-10. In one embodiment of the invention, TPM 115 comprises a processor with a small amount of on-chip memory encapsulated within a package. TPM 115 is configured to provide information to first platform 102 that would enable it to determine that a reply is transmitted from a valid TPM. The information used is content that would not make it likely that the TPM's or second platform's identify can be determined.

Figure 2:
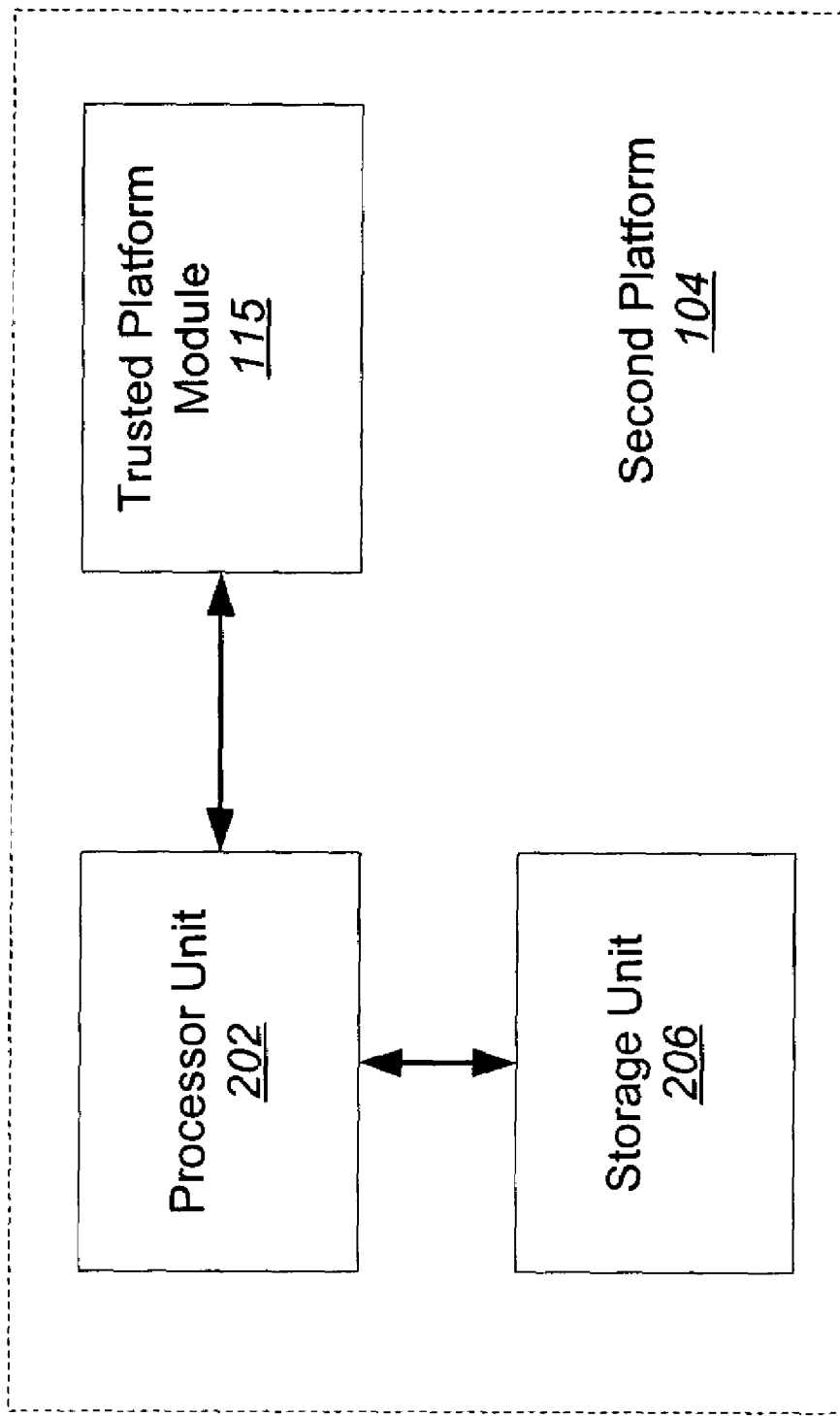
FIG. 2 illustrates a first embodiment of the platform including the TPM of FIG. 1.

FIG. 2 illustrates a first embodiment of second platform 104 with TPM 115. For this embodiment of the invention, second platform 104 comprises a processor 202 coupled to TPM 115. In general, processor 202 is a device that processes information. For instance, in one embodiment of the invention, processor 202 may be implemented as a microprocessor, digital signal processor, micro-controller or even a state machine. Alternatively, in another embodiment of the invention, processor 202 may be implemented as programmable or hard-coded logic, such as Field Programmable Gate Arrays (FPGAs), transistor-transistor logic (TTL) logic, or even an Application Specific Integrated Circuit (ASIC).

Figure 3:
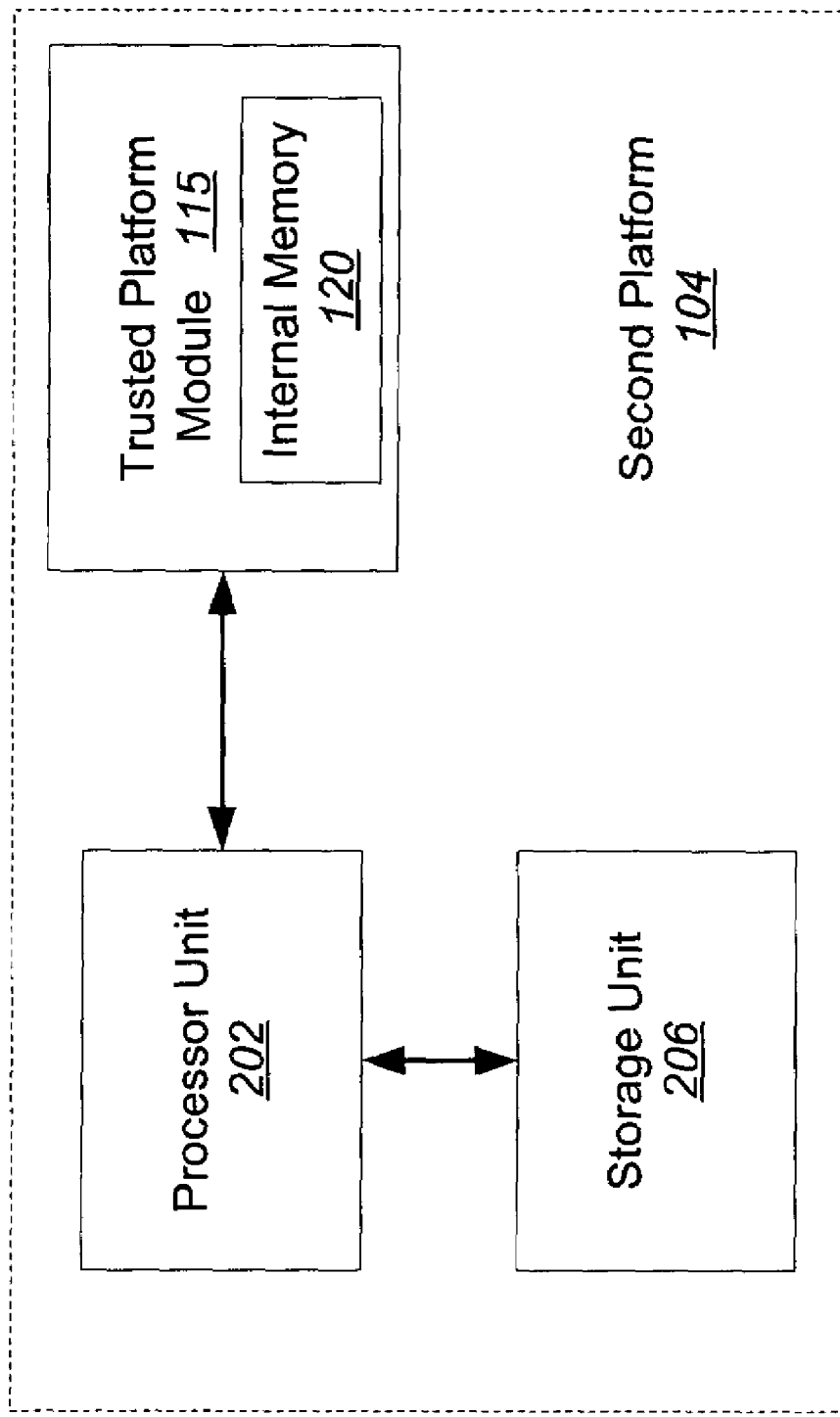
FIG. 3 illustrates a second embodiment of the platform including the TPM of FIG. 1.

Herein, second platform 104 further comprises a storage unit 206 to permit storage of cryptographic information such as one or more of the following: keys, hash values, signatures, certificates, etc. As shown below, a hash value of "X" may be represented as "Hash(X)". Of course, it is contemplated that such information may be stored within internal memory 220 of TPM 115 in lieu of storage unit 206 as shown in FIG. 3. The cryptographic information may be encrypted, especially if stored outside TPM 115.

Figure 4:
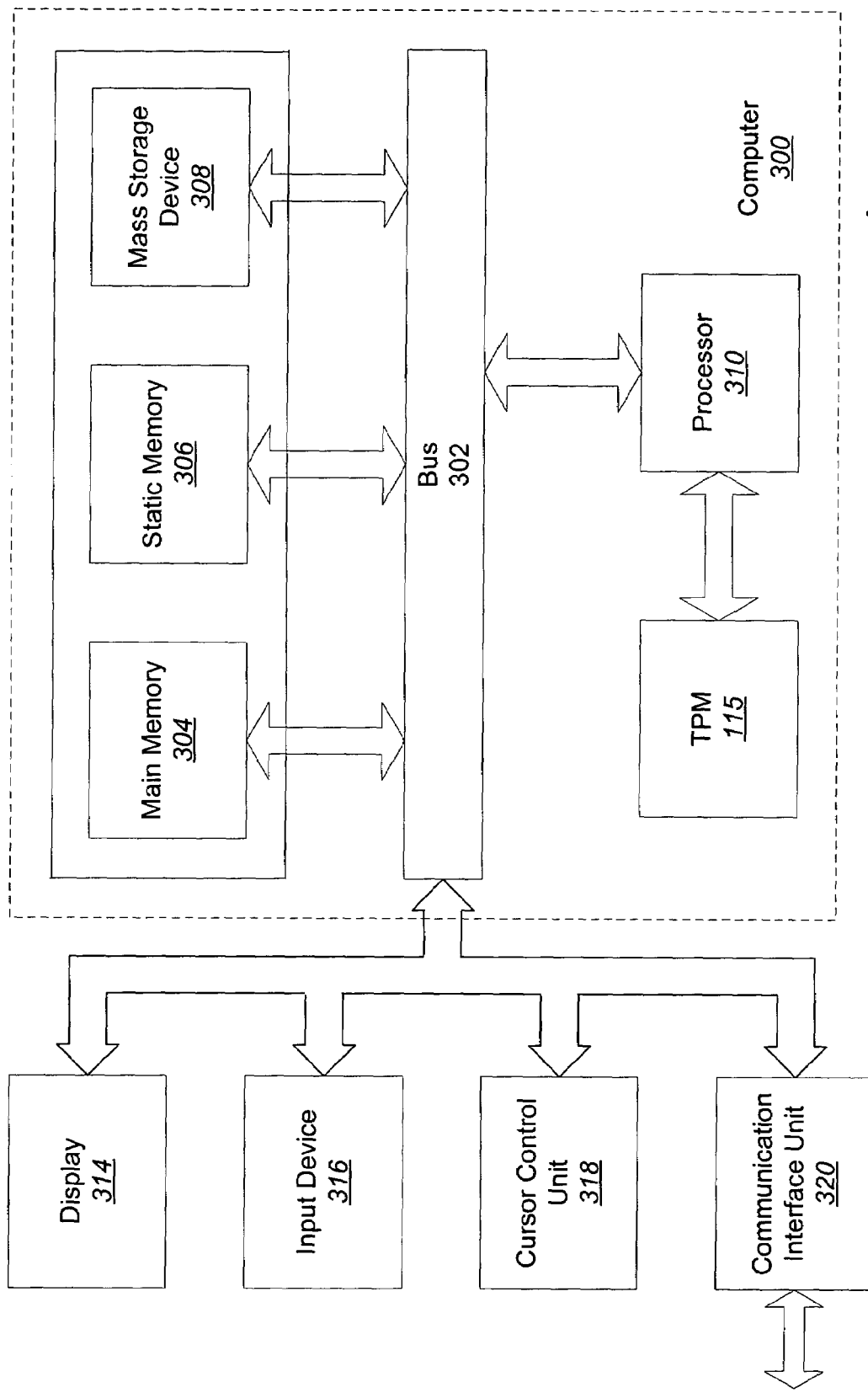
FIG. 4 illustrates an exemplary embodiment of a computer implemented with the TPM of FIG. 2.

FIG. 4 illustrates a specific embodiment of second platform 104 including a computer 300 implemented with TPM 115 of FIG. 2. Computer 300 comprises a bus 302 and a processor 310 coupled to bus 302. Computer 300 further comprises a main memory unit 304 and a static memory unit 306.

Herein, main memory unit 304 is volatile semiconductor memory for storing information and instructions executed by processor 310. Main memory 304 also may be used for storing temporary variables or other intermediate information during execution of instructions by processor 310. Static memory unit 306 is non-volatile semiconductor memory for storing information and instructions for processor 310 on a more permanent nature. Examples of static memory 306 include, but are not limited or restricted to read only memory (ROM). Both main memory unit 304 and static memory unit 306 are coupled to bus 302.

In one embodiment of the invention, computer 300 further comprises a data storage device 308 such as a magnetic disk or optical disc and its corresponding drive may also be coupled to computer 300 for storing information and instructions.

Computer 300 can also be coupled via bus 302 to a display 314, such as a cathode ray tube (CRT), Liquid Crystal Display (LCD) or any flat panel display, for displaying information to an end user. Typically, an alphanumeric input device 316 (e.g., keyboard, keypad, etc.) may be coupled to bus 302 for communicating information and/or command selections to processor 310. Another type of user input device is cursor control unit 318, such as a mouse, a trackball, touch pad, stylus, or cursor direction keys for communicating direction information and command selections to processor 310 and for controlling cursor movement on display 314.

A communication interface unit 320 is also coupled to bus 302. Examples of interface unit 320 include a modem, a network interface card, or other well-known interfaces used for coupling to a communication link forming part of a local or wide area network. In this manner, computer 300 may be coupled to a number of clients and/or servers via a conventional network infrastructure, such as a company's Intranet and/or the Internet, for example.

It is appreciated that a lesser or more equipped computer than described above may be desirable for certain implementations. Therefore, the configuration of computer 300 will vary from implementation to implementation depending upon numerous factors, such as price constraints, performance requirements, technological improvements, and/or other circumstances.

II. Platform Set-up

Figure 5:
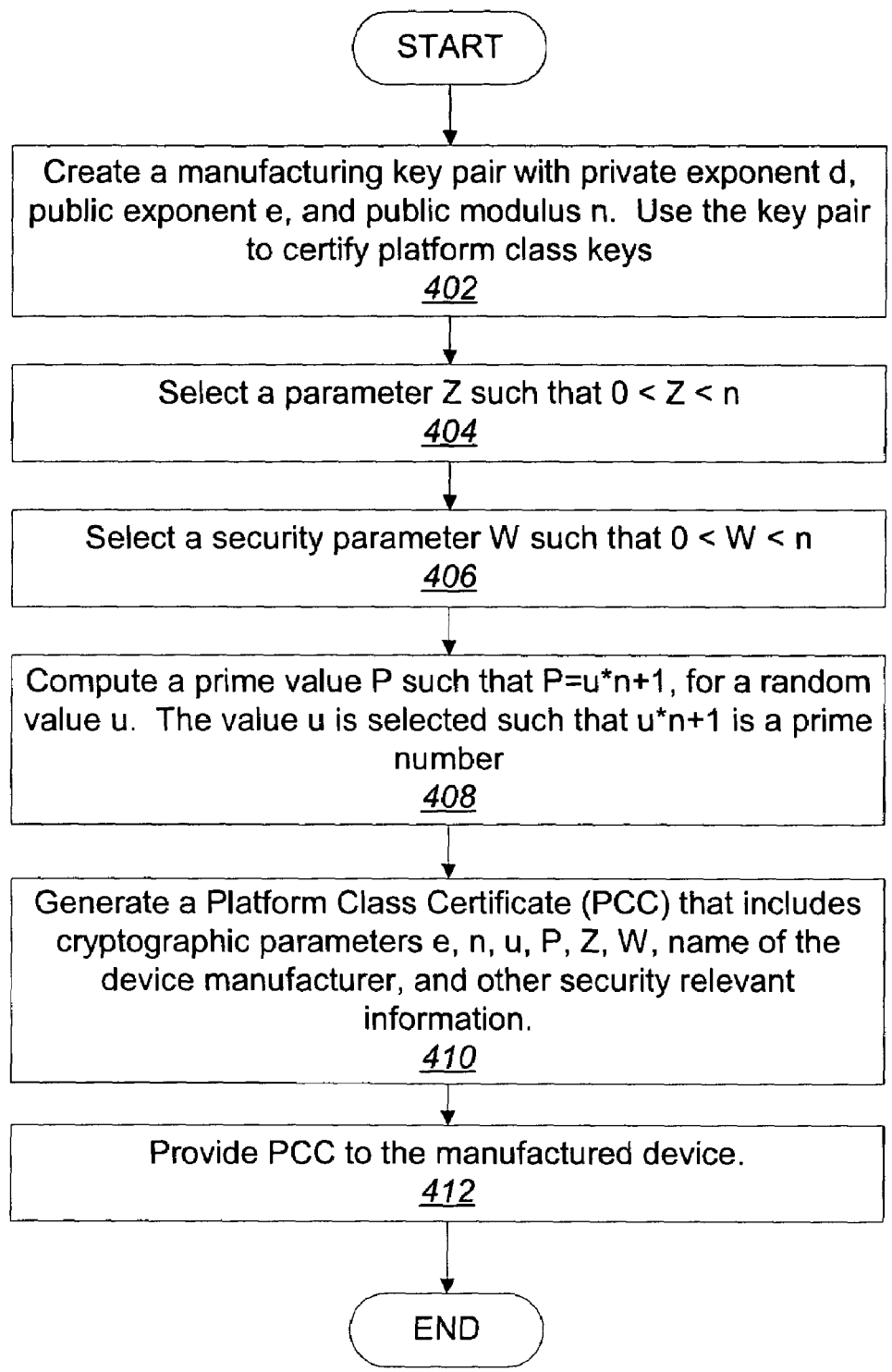
FIG. 5 illustrates a flow diagram of a procedure to setup a TPM during manufacturing according to one embodiment of the invention.

FIG. 5 illustrates the setup performed for each platform class according to one embodiment of the invention. A "platform class" may be defined by the device manufacturer to include one or more types of platforms or devices. For instance, a platform class may be the set of all platforms that have the same security relevant information. This security relevant information could contain some of the information that is included in the EK or AIK certificate in the TCPA model. It could also include the manufacturer and model number of the particular platform or device.

For each platform class, a device manufacturer creates the cryptographic parameters that the manufacturer uses for that platform class. The device manufacturer creates a signature key that it uses to sign the secrets for the devices (e.g., platform 104 or TPM 115) that it manufactures.

In one embodiment of the invention, the device manufacturer utilizes a public key cryptographic function (e.g., RSA function) to create an RSA public/private key pair with public modulus n, public exponent e, and private exponent d (block 402). The public key is based on values e,n while the private key is based on d,n. This can be created using well known methods, such as those described in *Applied Cryptography*, by Bruce Schneier, John Wiley & Sons; ISBN: 0471117099; Second Edition (1996). The modulus n should be chosen large enough so that it is computationally infeasible to factor n.

The device manufacturer specifies a parameter Z, which is an integer between zero (0) and n (block 404).

The device manufacturer specifies a security parameter W, which is an integer between zero (0) and n (block 406). However, picking W too small or too large may introduce a security failure. In one embodiment of the invention, W is selected to be approximately $2^{160}$. Selecting W to be between $2^{80}$ and the square root of n is recommended.

In one embodiment of the invention, the device manufacturer computes a prime number P, such that $P=u*n+1$ (block 408). Any value of u can be used; however, to retain an acceptable level of security, the value P should be large enough so that computing a discrete logarithm "mod P" is computationally infeasible.

The device manufacturer generates a Platform Class Certificate that comprises cryptographic parameters e, n, u, P, Z, W, the security relevant information of the platform class, and the name of the device manufacturer (block 410). In one embodiment, the parameters u and P would not both be included since given n and one of these parameters, the other can be computed by $P=u*n+1$.

In one embodiment of the invention, the device manufacturer uses the same cryptographic parameters e, n, u, P, W for several different platform classes, and just varies the value Z for the different platforms. In this case, the values of Z may be chosen to differ by approximately or at least 4W, although the selected difference is a design choice.

Once the Platform Class Certificate is generated, the device manufacturer provides the Platform Class Certificate to the platforms or devices it manufactures which belong to that particular platform class (block 412).

The distribution of cryptographic parameters associated with the Platform Class Certificate from a responder (e.g., second platform 104 in FIG. 1) to a challenger may be accomplished in a number of ways. However, these cryptographic parameters should be distributed to the challenger in such a way that the challenger is convinced that the Platform Class Certificate was generated by the device manufacturer.

For instance, one accepted method is by distributing the parameters directly to the challenger. Another accepted method is by distributing the Platform Class Certificate signed by a certifying authority, being the device manufacturer as one example. In this latter method, the public key of the certifying authority should be distributed to the challenger, and the signed Platform Class Certificate can be given to each platform in the platform class. The responder can then provide the signed Platform Class Certificate to the challenger.

Figure 6:
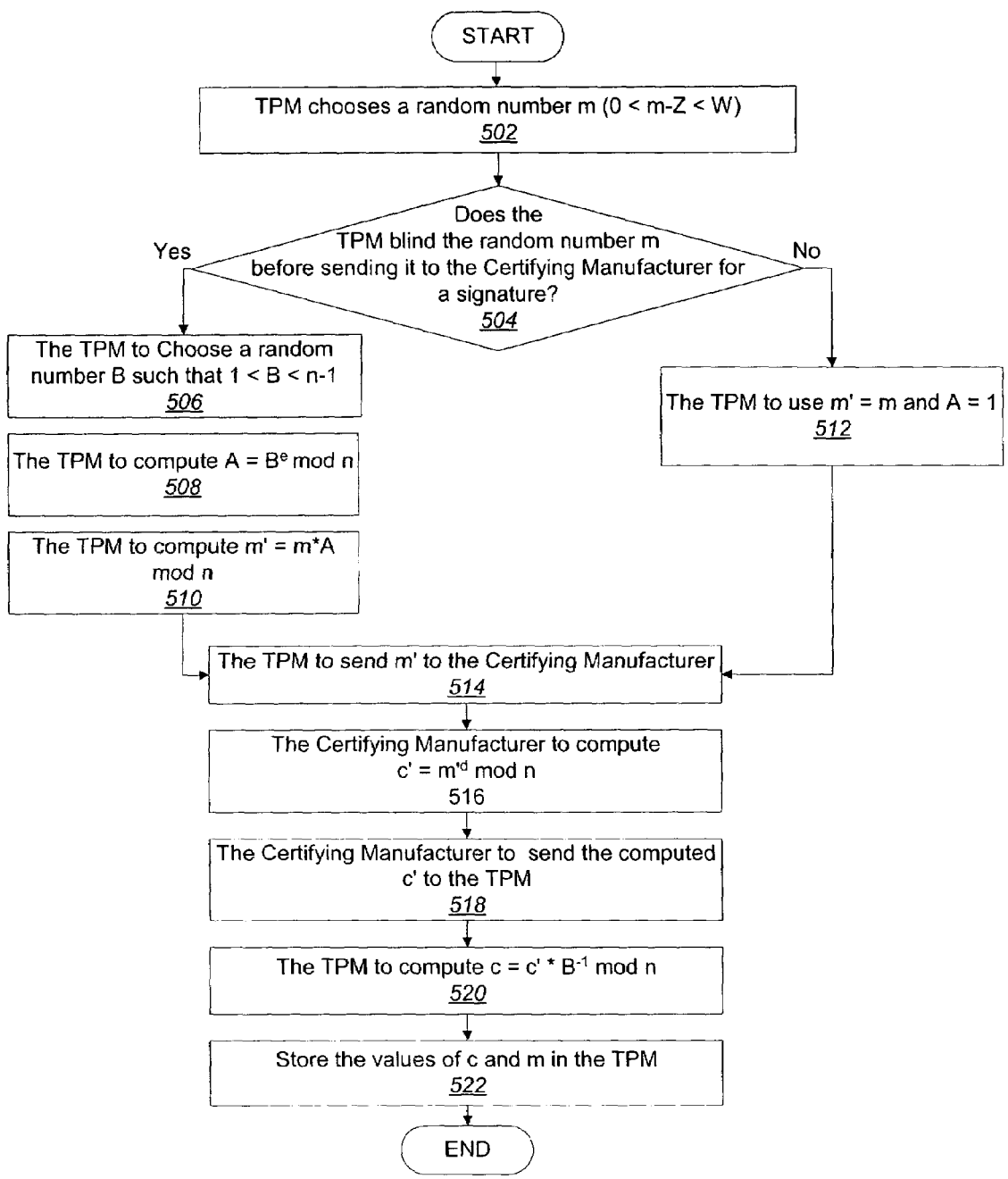
FIG. 6 illustrates a flow diagram of a procedure to setup each platform manufactured according to one embodiment of the invention.

FIG. 6 illustrates the setup performed for a platform (responder) manufactured according to one embodiment of the invention. The TPM of the responder platform chooses a random number m such that $0<m-Z<W$ (block 502). The TPM may blind this random number m before sending it to the certifying manufacturer for signature (block 504). This blinding operation is performed to obfuscate the exact contents of the random number m from the certifying manufacturer. In this case, the TPM chooses a random number, B, where $1<B<n-1$ (block 506), and computes $A=B^e$ mod n (block 508). Then, the TPM computes $m'=m*A$ mod n (block 510).

If the TPM does not blind m, then the TPM uses $m'=m$ and $A=1$ (block 512).

After performing these computations, TPM sends m' to the certifying manufacturer (block 514). The certifying manufacturer computes $c'=m'^d$ mod n (block 516), and provides c' to the responder (block 518). The TPM of the responder computes $c=c'*B^{-1}$ mod n (block 520). Notice that this implies that $c=m^d$ mod n. The values c and m are then stored in the TPM or external storage within the responder (block 522). The pair, c and m, is referred to as a signature of the device manufacturer.

III. Functionality of the TPM

Figure 7:
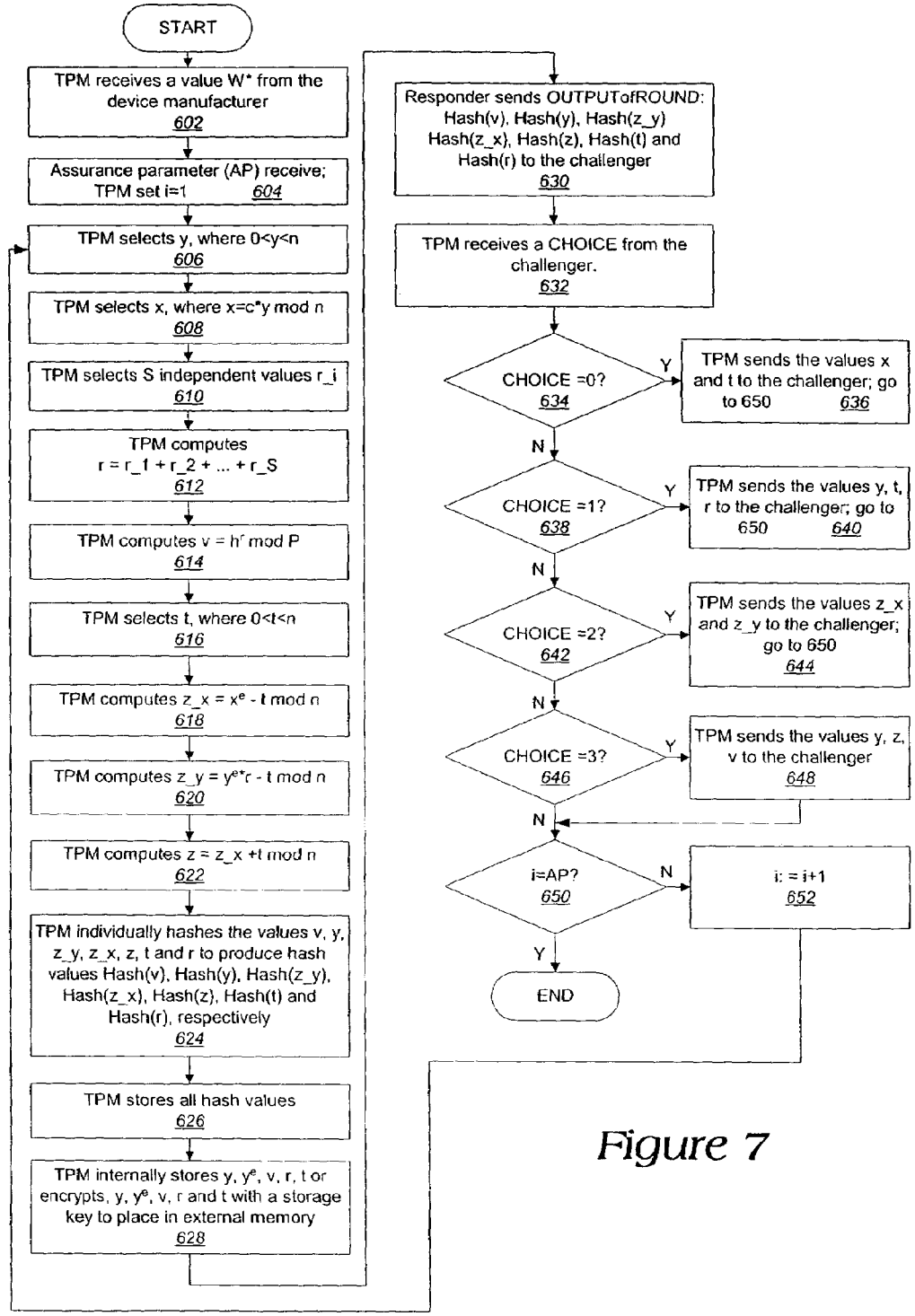
FIG. 7 illustrates a first exemplary embodiment of an interactive direct proof method for a platform (responder) to prove to a challenger that it knows authentication information without revealing that information.
Figure 8:
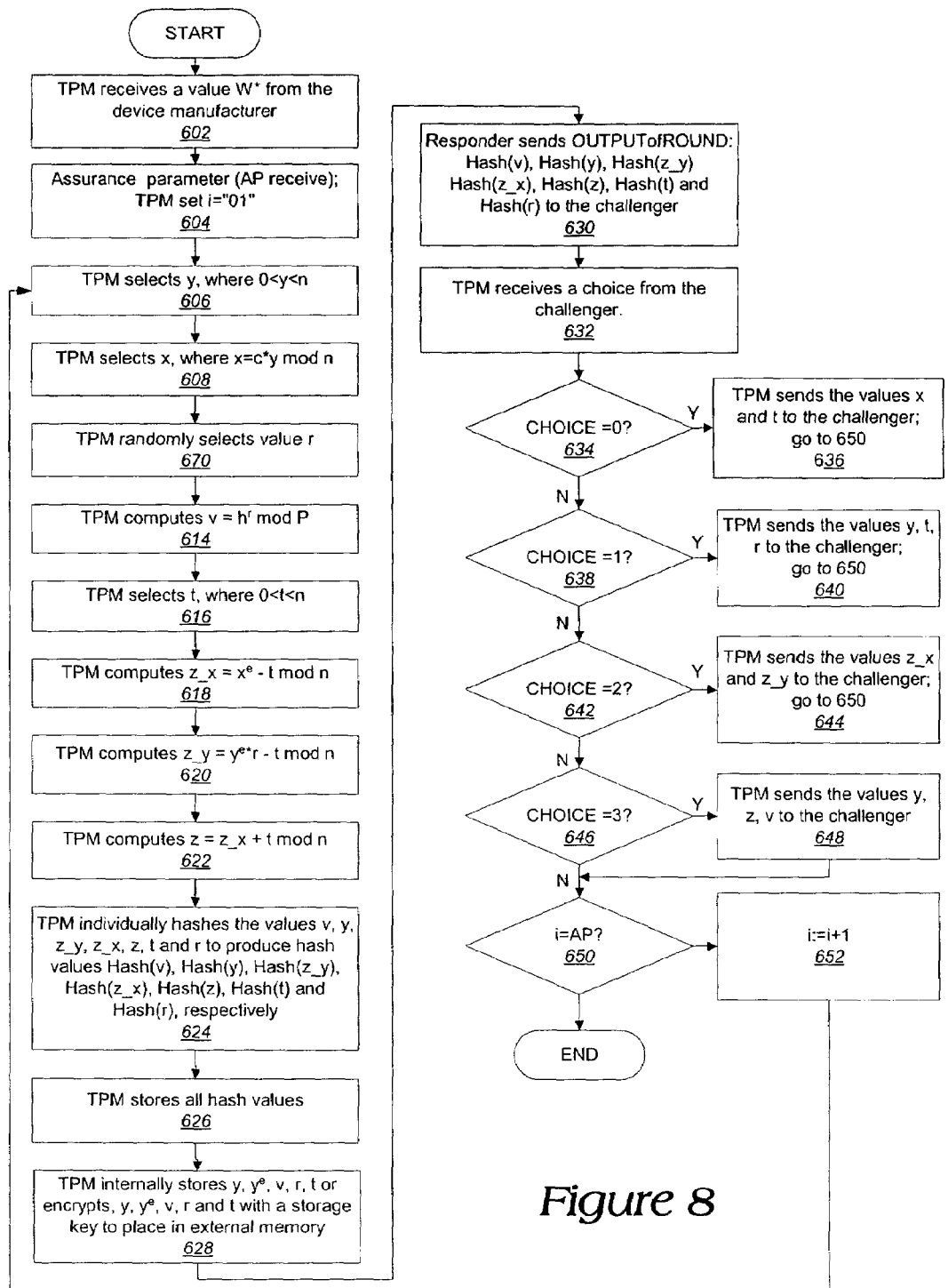
FIG. 8 illustrates a second exemplary embodiment of an interactive direct proof method for a platform (responder).

The TPM may be adapted to operate in three (3) modes of operation in order for the TPM to prove to a challenger that certain information came from the TPM without revealing information concerning the identity of the TPM or stored cryptographic information. These modes of operation include, but are not limited to: (1) multiple communication mode (FIGS. 7,8); (2) reduced communication mode (FIG. 9); and (3) non-interactive mode (FIG. 10).

In general, during multiple communication mode, the TPM sends an output (OUTPUTofROUND) after each iteration (or round) of a direct proof, which requires the challenger to respond with a value (e.g., CHOICE value) for that round. The CHOICE value indicates what information is requested by the challenger for that round. During reduced communication mode, however, the TPM requires the challenger to select and commit to a particular value which will be used as input to the CHOICES for all of the rounds before commencement of the direct proof. Finally, during non-interactive mode, the TPM computes all of the rounds, and computes CHOICES based on all of the OUTPUTofROUND results for all of the rounds. No interaction with the challenger is required.

Figure 9:
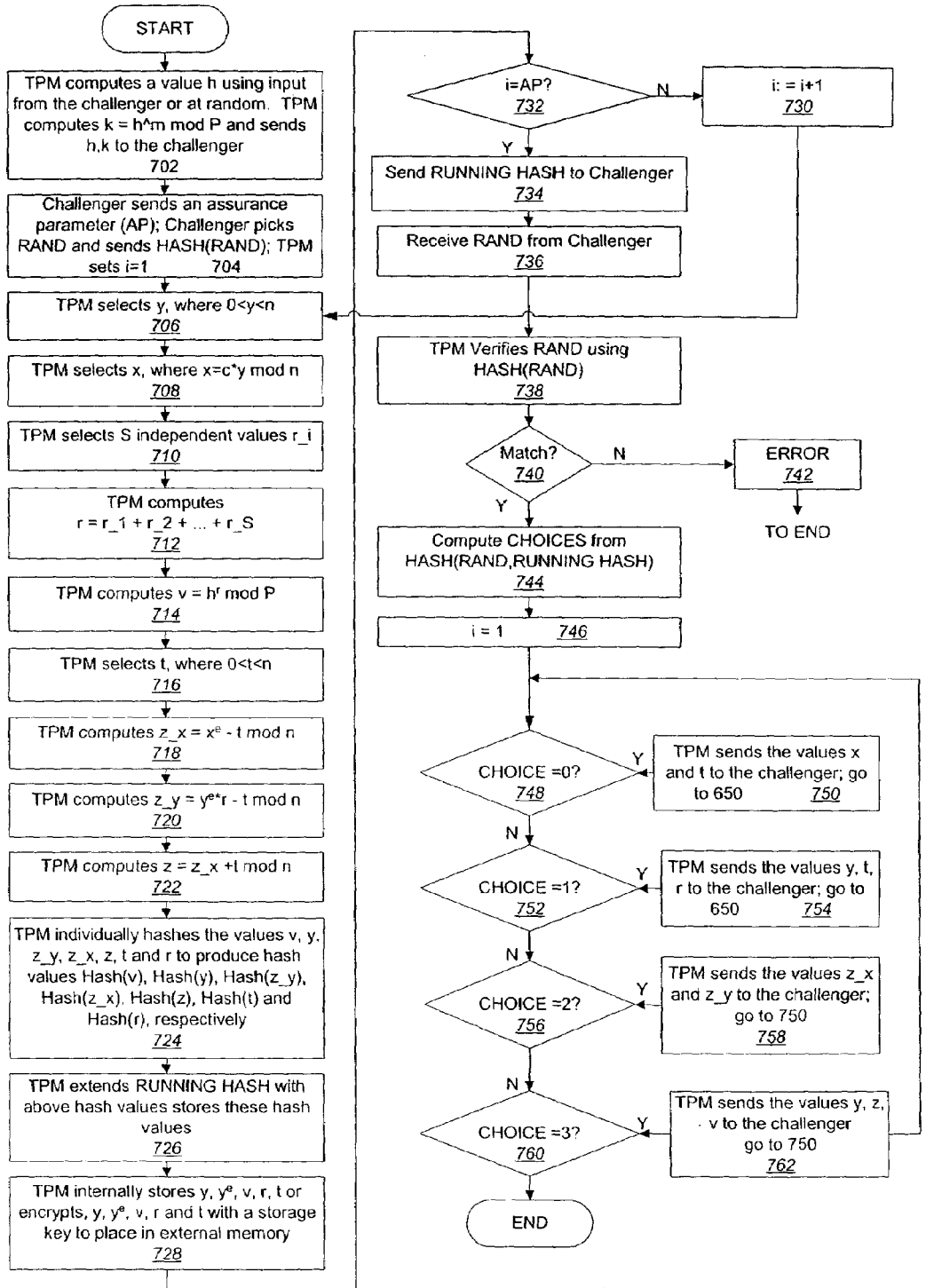
FIG. 9 illustrates a third exemplary embodiment of an interactive direct proof method for a platform (responder).
Figure 10:
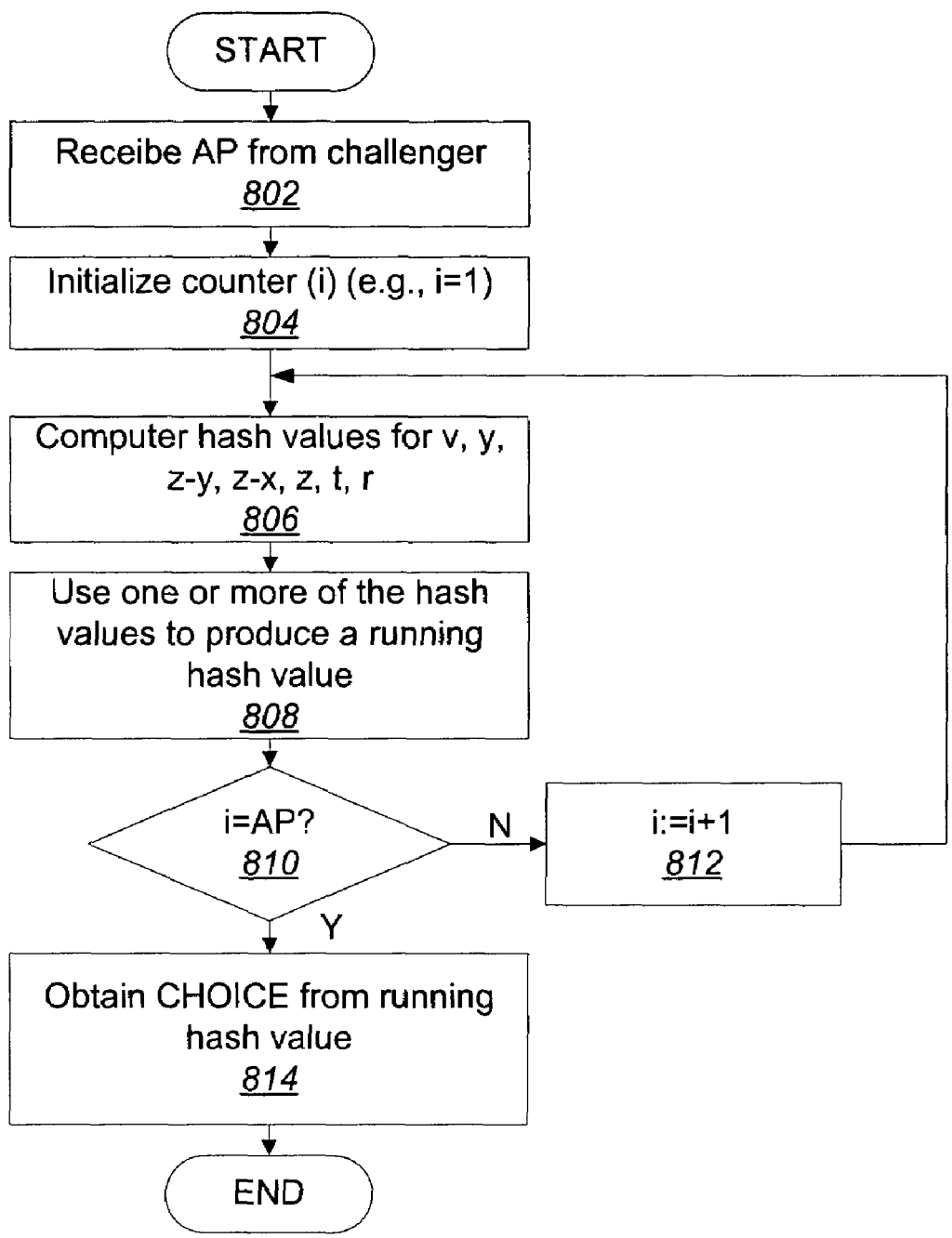
FIG. 10 illustrates a first exemplary embodiment of a non-interactive direct proof method for a platform (responder) to prove to a challenger that it knows authentication information without revealing that information.

As described below, FIGS. 7-9 illustrate exemplary embodiments of interactive methods for a responder to prove to a challenger that it possesses certain cryptographic information (e.g., a cryptographic parameter such as a signature, secret data, key, etc.) from the certifying manufacturer without revealing the cryptographic parameter. According to one embodiment of the invention and as an illustrative embodiment for clarity purposes, the cryptographic parameter is selected to be a signature.

More specifically, for these embodiments of the invention, a challenger (e.g., first platform 102) supplies an assurance parameter (AP) that indicates the number of iterations (or rounds) of processing to be performed by the TPM. For FIGS. 7 and 8, for each round, the challenger will provide a CHOICE value which indicates what type of information is requested by the challenger. This technique requires communications between the TPM and the challenger for each round.

For FIG. 9, the challenger commits to a value which will be used to compute the choices for all of the rounds before any of the rounds start. This reduces the number of communications between the TPM and the challenger. Such commitment may be accomplished through a variety of techniques. For instance, according to one embodiment of the invention, the challenger could select a large random or pseudo-random value, RAND, and compute a hash value of RAND, namely HASH(RAND). The challenger could send HASH(RAND) to the TPM. After the TPM has computed the information from all of the rounds, the TPM could compute a running hash value for the TPM computed information from all of the rounds (referred to as a "RUNNING HASH"). The RUNNING HASH would be sent to the challenger, soliciting the challenger to respond by providing RAND. At this processing stage, the TPM could verify that HASH(RAND) matches a newly computed hash value of RAND. Then, the CHOICEs for all of the rounds could be computed by a combination of RAND and RUNNING HASH, for instance each CHOICE=HASH(RAND, RUNNING HASH) as described below.

Once the CHOICE is revealed by the challenger or determined by the process outlined above, the TPM proves the validity and authenticity of the requested information by providing certain values in accordance with a direct proof as set forth below. This direct proof reduces the overall processing time by the system and substantially reduces the complexity of the communication exchange between the challenger and the responder.

Referring now to FIG. 7, prior to performing the direct proof, the TPM receives a value W* from the device manufacturer as part of the cryptographic parameters (block 602). The value W* is chosen to be larger than W. W would typically be chosen to be about $2^{160}$, and W* would typically be chosen to be around $2^{180}$. However, a different value of W* may be utilized based on the amount of security desired.

The challenger supplies an assurance parameter (AP) to the TPM (block 604). The AP indicates the number of iterations (or rounds) of processing to be performed by the TPM for the subsequent blocks.

As internal operations, the TPM selects y, where 0<y<n (block 606). Such selection may be random or pseudo-random in nature. The TPM computes x such that x=c*y mod n (block 608). The TPM randomly or pseudo-randomly selects S independent values $r\_i$ ($1 \leq r\_i \leq W^*$) and computes $r=r\_1+r\_2+ \ldots +r\_S$. (blocks 610 and 612). Normally, S is a generally small number, less than 100. For one embodiment of the invention, S ranges between 5 and 20. Thereafter, as shown in block 614, the value v is computed ($v=h^r$ mod P). The value h may be randomly generated, pseudo-randomly generated or generated in a deterministic manner. The value h should have a property that $h^n=1$ mod P and that the TPM uses a different h value for each challenger. Where the value h is determined randomly or pseudo-randomly, the value h is sent to the challenger, normally prior to the transmission of the cryptographic parameters noted above.

The TPM selects t, where 0<t<n (block 616). Again, such selection may be random or pseudo-random in nature. The value "t" is used to disguise values $x^e$ and $y^e$ after z_x and z_y are computed as shown in equations (1-3) and perhaps known to the challenger. The reason is that the value c can be determined if both x and y are known by the challenger, assuming the challenger also knows the public values, e,n,(blocks 618, 620 and 622).

$$z\_x = x^e - t \bmod n \quad (1)$$

$$z\_y = y^e * r + t \bmod n \quad (2)$$

$$z = z\_x + z\_y \bmod n \quad (3)$$

Thereafter, the TPM individually hashes the values v, y, z_y, z_x, z, t and r to produce hash values Hash(v), Hash(y), Hash(z_y), Hash(z_x), Hash(z), Hash(t) and Hash(r), respectively (block 624). The TPM stores all of these hash values in internal memory 220 of FIG. 3 or outputs these hash values into an external memory such as storage unit 206 of FIG. 2 (block 626). In addition, the TPM either internally stores y, $y^e$, v, r, t or encrypts y, $y^e$, v, r and t with a storage key (e.g., a private key produced by any selected encryption function) and stores the encrypted values in external memory of the second platform (block 628). It is contemplated that the values of y and t were computed pseudo-randomly from a common random seed so that only $y^e$, v, r, and the random seed could be stored in order to reduce the amount of storage area required. All other values can be recomputed from these stored values as necessary. The TPM also prompts the responder to send Hash(v), Hash(y), Hash(z_y), Hash(z_x), Hash(z), Hash(t) and Hash (r) to the challenger (block 630). This block of data (Hash (v), Hash(y), Hash(z_y), Hash(z_x), Hash(z), Hash(t), Hash (r)) is the output of the TPM from this round, which is referred to as the "OUTPUTofROUND" as described above. The OUTPUTofROUND is sent to the challenger as each round is computed, and the CHOICE for that round may be provided by the challenger to the TPM at the end of each round. The CHOICE may be revealed through recovery or perhaps generation based on a value originally supplied by the challenger and later value produced by the responder as described above (block 632). For illustrative purposes, the CHOICE is set to have a value ranging between zero (0) and three (3).

If CHOICE=0, then the TPM sends the values x and t in the clear to the challenger (blocks 634 and 636). This enables the challenger to generally check the value of x because the challenger previously received e & n as part of the cryptographic parameters. Namely, the challenger now computes $z\_x = x^e - t \mod n$ and verifies the Hash(t) and Hash(z_x).

If CHOICE=1, then the TPM sends the values y, t, r to the challenger (blocks 638 and 640). This enables the challenger to generally check the value of y. Namely, the challenger computes $z\_y = y^e * r + t \mod n$ and $v = h^r \mod P$ since cryptographic parameters n, P and h were previously made available to challenger. Thus, challenger verifies the Hash(y) Hash(t), Hash(r), Hash(z_y) and Hash(v). The challenger further verifies that r is within a range from 0 to W*.

If CHOICE=2, then the TPM sends the values z_x and z_y to the challenger (blocks 642 and 644). This enables the challenger to generally check the value of z. The challenger computes $z = z\_x + (z\_y \mod n)$ and verifies Hash(z_x) and Hash(z_y).

If CHOICE=3, then the TPM sends the values y, z, v to the challenger, which enables the challenger to verify Hash(y), Hash(z) and Hash(v) (blocks 646 and 648). The challenger checks that $h^z = (k*v)^{\{y^e \mod n\}} \mod P$. The value k should have a property that $k = h^m \mod P$ and is sent to the challenger, normally prior to the transmission of the cryptographic parameters noted above (e.g., with value h).

The challenger computes $s = z*y^{-e} \mod n$ and checks that s is in a range between Z and Z+W+W*. For CHOICE=3, it is contemplated that s=m+r and that m+r is in the range from Z to Z+W+W*.

Thus, the only exponentiations required by the TPM is of the form $h^t \mod P$, where t is randomly chosen from a small interval and of the form $y^e \mod n$, where e is a small constant. Previously, the TPM was required to perform exponentiations of the form $h^t \mod P$, where t was the result of a modular exponentiation mod n, and was 2000 bits in length. Thus, for one embodiment of the invention, the computation time to perform the operations of FIG. 7 has been reduced by a factor of 5. Overall, a computation time reduction of at least 50% and even 80% or more is achieved.

Referring now to FIG. 8, the same operations associated with the interactive method of FIG. 7 are performed. However, the value r is randomly selected (block 670) in lieu of being based on S independent values set forth at blocks 610 and 612 of FIG. 7. This requires W* to be of a value of around $2^{220}$ or higher to get reasonable security.

Referring now to FIG. 9, the challenger commits to a value used to compute all of the choices for information (CHOICES) for all of the rounds before any of the rounds commence. In accordance with the TPM being in the reduced communication mode, the number of communications between the TPM and the challenger are greatly reduced.

According to one embodiment of the invention, the TPM computes the value h, which may be randomly generated, pseudo-randomly generated or generated in a deterministic manner. The seed and method for computing the value h may be provided by the challenger. Thereafter, the TPM computes the value k, which is equal to $h^m \mod P$, where "m" is a random number and "P" is a prime number as described above. Both values h and k are sent by the TPM to the challenger (block 702).

The challenger selects a random or pseudo-random value (RAND) which is used to compute CHOICE and provides a modified version of RAND to the TPM. The modified version may be an encrypted version of RAND (e.g., encrypted with a symmetric key shared by the challenger and responder) or a hash result of RAND to produce (HASH(RAND)). The TPM also receives an assurance parameter (AP) from the challenger. The AP indicates the number of iterations (or rounds) of computations to be performed by the TPM (block 704). A count (i) of the number of rounds performed is set to an initial value (e.g., i=1) and is subsequently adjusted (i.e., incremented or decremented) to ensure that the desired number of rounds are performed.

As internal operations, for each round, the TPM selects y, where 0<y<n (block 706). Such selection may be random or pseudo-random in nature. The TPM computes x such that $x = c*y \mod n$ (block 708). The TPM randomly or pseudo-randomly selects S independent values r_i (1<r_i<W*) and computes r=r_1+r_2+ . . . +r_S. (blocks 710 and 712). Normally, S is a generally small number, less than 100. For one embodiment of the invention, S ranges between 5 and 20. Thereafter, as shown in block 714, the value v is computed ($v = h^r \mod P$). It is noted that the TPM uses a different value h for each challenger.

The TPM randomly or pseudo-randomly selects t, where 0<t<n (block 716). The value "t" is used to disguise values $x^e$ and $y^e$ after z_x and z_y are computed as shown above in equations (1-3). The reason is that the value c can be determined if both x and y are known by the challenger, assuming the challenger also knows the public values, e,n,(blocks 718, 720 and 722).

Thereafter, the TPM individually hashes the values v, y, z_y, z_x, z, t and r to produce hash values Hash(v), Hash(y), Hash(z_y), Hash(z_x), Hash(z), Hash(t) and Hash(r), respectively (block 724). The TPM continuously maintains a running hash value where these hash values are loaded and undergo hash operations (hereinafter referred to as the "RUNNING HASH").

Thereafter, the TPM either internally stores y, $y^e$, v, r, t or encrypts y, $y^e$, v, r and t with a storage key (e.g., a private key produced by any selected encryption function) and stores the encrypted values in external memory of the second platform (block 728). It is contemplated that if values y and t were computed pseudo-randomly from a common random seed, only $y^e$, v, r, and the random seed would need to be stored in effort to reduce the amount of storage area required.

Thereafter, the count (i) is compared with AP to determine if all rounds have been completed (block 730). If not, the count is adjusted (e.g., incremented) and another round of computations is performed (block 732).

However, if all rounds have been completed, the TPM sends RUNNING HASH to the challenger (block 734). In response the TPM receives RAND from the challenger (block 736). Where the HASH(RAND) was previously sent by the challenger, the TPM verifies RAND by performing a one-way hash operation on RAND using the same hash function as used by the challenger (block 738). This produces a hash value, which is compared with HASH(RAND). If a match is determined, RAND has not been corrupted (block 740). Otherwise, an error is reported (block 742).

Thereafter, the selected CHOICE can be revealed by performing a hash on RAND and RUNNING HASH (block 744). For illustrative purposes, the CHOICE is set to have a value ranging between zero (0) and three (3). The iterative transmission of data is accomplished by a looping function established by blocks 746, 764 and 766. In an alternative embodiment, the CHOICE could be determined directly from RAND.

Herein, as an example, if CHOICE=0, then the TPM sends the values x and t in the clear to the challenger (blocks 748 and 750). This enables the challenger to generally check the value of x because the challenger previously received e & n as part of the cryptographic parameters. Namely, the challenger now computes $z\_x = x^e - t$ mod n and verifies the Hash(t) and Hash(z_x).

If CHOICE=1, then the TPM sends the values y, t, r to the challenger (blocks 752 and 754). This enables the challenger to generally check the value of y. Namely, the challenger computes $z\_y = y^e * r + t$ mod n and $v = h^r$ mod P since cryptographic parameters n, P and h were previously made available to challenger. Thus, challenger verifies the Hash(y) Hash(t), Hash(r), Hash(z_y) and Hash(v). The challenger further verifies that r is within a range from 0 to W*.

If CHOICE=2, then the TPM sends the values z_x and z_y to the challenger (blocks 756 and 758). This enables the challenger to generally check the value of z. The challenger computes $z = z\_x + (z\_y$ mod n$)$ and verifies Hash(z_x) and Hash(z_y).

If CHOICE=3, then the TPM sends the values y, z, v to the challenger, which enables the challenger to verify Hash(y), Hash(z) and Hash(v) (blocks 760 and 762). The challenger checks that $h^z = (k*v)^{\{y^e \bmod n\}}$ mod P. The value k should have a property that $k = h^m$ mod P and is sent to the challenger, normally prior to the transmission of the cryptographic parameters noted above (e.g., with value h).

The challenger computes $s = z*y^{-e}$ mod n and checks that s is in a range between Z and Z+W+W*. For CHOICE=3, it is contemplated that $s = m + r$ and that m+r is in the range from Z to Z+w+W*.

Of course, it is contemplated that operations set forth in blocks 702 and 704 may be slightly altered to reduce the number of communication cycles between the challenger and the responder. For instance, when the challenger requests a direct proof from the TPM, the challenger also provides a seed and method for computing the value h, the value of the AP and the modified version of RAND to the responder. The TPM performs the computations for each of the rounds, but at the end, sends h, k and RUNNING HASH to the challenger.

For another embodiment of the invention, referring to FIG. 10, an embodiment of a non-interactive method for the responder to prove to a challenger that it has a cryptographic parameter from the certifying manufacturer without revealing the cryptographic parameter is shown. Herein, the direct proof involves a plurality of operations as requested by the challenger, namely based on the value of AP (block 802). After a counter (i) is set, for each iteration, a responder continuously maintains a running hash value based on one or more of the following hash values computed during the iteration: Hash(v), Hash(y), Hash(z_y), Hash(z_x), Hash(z), Hash(t) and Hash(r) (blocks 804, 806, 808, 810, 812). After all (AP) iterations have been completed by the TPM, the running hash value is used to indicate the CHOICE (block 814).

For instance, in one embodiment of the invention, the least significant bits of the running hash value are used to denote which of a plurality of CHOICEs is selected (e.g., two bits needed for 4 CHOICEs). In another embodiment of the invention, the most significant bits of the running hash value are used. In yet another embodiment of the invention, a logical operation is performed on bits of the running hash value to produce a value that denotes one of the plurality of CHOICEs.

While certain exemplary embodiments of the invention have been described and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible. It is possible to implement the embodiments of the invention or some of their features in hardware, programmable devices, firmware, software or a combination thereof.

What is claimed is:

1. A method comprising:
   receiving a request for information by a cryptographic device; and
   proving in a single direct proof that a value was signed by a signature key without revealing the value, the single direct proof comprises a plurality of exponentiations of which all of the plurality of exponentiations are conducted using a fixed exponent less in bit length than a bit length of a modulus (n), the plurality of exponentiations conducted are of the form $h^t$ mod P, where h is a unique number, t is randomly chosen between an interval between 0 and W, P is a prime number, and W is a number greater than 280.

2. The method of claim 1, wherein the bit length of the exponent being at most 160 bits in length.

3. The method of claim 2, wherein the modulus (n) is over 1000 bits in length.

4. The method of claim 1, wherein the bit length of the fixed exponents associated with the exponentiations are a constant value despite any increase in value of the modulus (n).

5. The method of claim 1, wherein the bit length of the exponent being less than one-eighth the bit length of the modulus (n).

6. A platform comprising:
   a bus;
   a network interface card coupled to the bus; and
   a processor coupled to the bus; and
   a trusted platform module coupled to the processor, in response to a challenge received over the network interface card, the trusted platform module to perform a direct proof in order to prove that the trusted platform module has a digital signature from a device manufacturer and the digital signature is valid without revealing the digital signature, the direct proof comprises a plurality of exponentiations each being conducted using an exponent having a bit length no more than one-half a bit length of a modulus (n), the plurality of exponentiations feature a format $h^t$ mod P, where "h" is a unique number, "t" is randomly chosen number, and "P" is a prime number.

7. The platform of claim 6, wherein the direct proof performed by the trusted platform module is conducted with the bit length of each exponent associated with all of the plurality of exponentiations being at most 160 bits in length.

8. The platform of claim 6, wherein the direct proof performed by the trusted platform module is conducted with the bit length of each exponent associated with all of the plurality of exponentiations being a constant value despite any increase in value of the modulus (n).

9. The platform of claim 6, where the plurality of exponentiations associated with the direct proof include the randomly chosen number "t" being between an interval between 0 and W, where W is a number greater than 280.

10. The platform of claim 6, wherein the bit length of the exponent being less than one-eighth the bit length of the modulus (n).

* * * * *